United States Patent [19]

Wilson, Sr.

[11] 4,213,791

[45] Jul. 22, 1980

[54] PROCESS FOR PRODUCING PORTLAND AND OTHER HYDRAULIC CEMENTS

[76] Inventor: Eddie K. Wilson, Sr., 5877 Essex Ct. - Apartment 2, Memphis, Tenn. 38138

[21] Appl. No.: 947,599

[22] Filed: Oct. 2, 1978

Related U.S. Application Data

[63] Continuation-in-part of Ser. No. 690,510, May 27, 1976, abandoned.

[51] Int. Cl.² .................................................. C04B 7/46
[52] U.S. Cl. ..................................... 106/100; 106/103; 106/104; 106/117
[58] Field of Search ............... 106/100, 102, 103, 104, 106/117

[56] References Cited

U.S. PATENT DOCUMENTS

| | | | |
|---|---|---|---|
| 14,010 | 10/1884 | Cooper | 106/117 |
| 397,373 | 2/1889 | Lesley | 106/103 |
| 1,731,189 | 10/1929 | Bergquist | 106/103 |
| 2,209,636 | 7/1940 | Schubert | 106/100 |

*Primary Examiner*—James Poer
*Attorney, Agent, or Firm*—Gravely, Lieder & Woodruff

[57] ABSTRACT

A process for the production of portland and other hydraulic cement products is provided. The process is characterized by an electric furnace into which the reactant materials are fed. The process is further characterized by avoiding the necessity for pulverizing and intergrinding the feed materials. Another characteristic is that all feed materials become molten and remain molten until after removal from the furnace.

15 Claims, 1 Drawing Figure

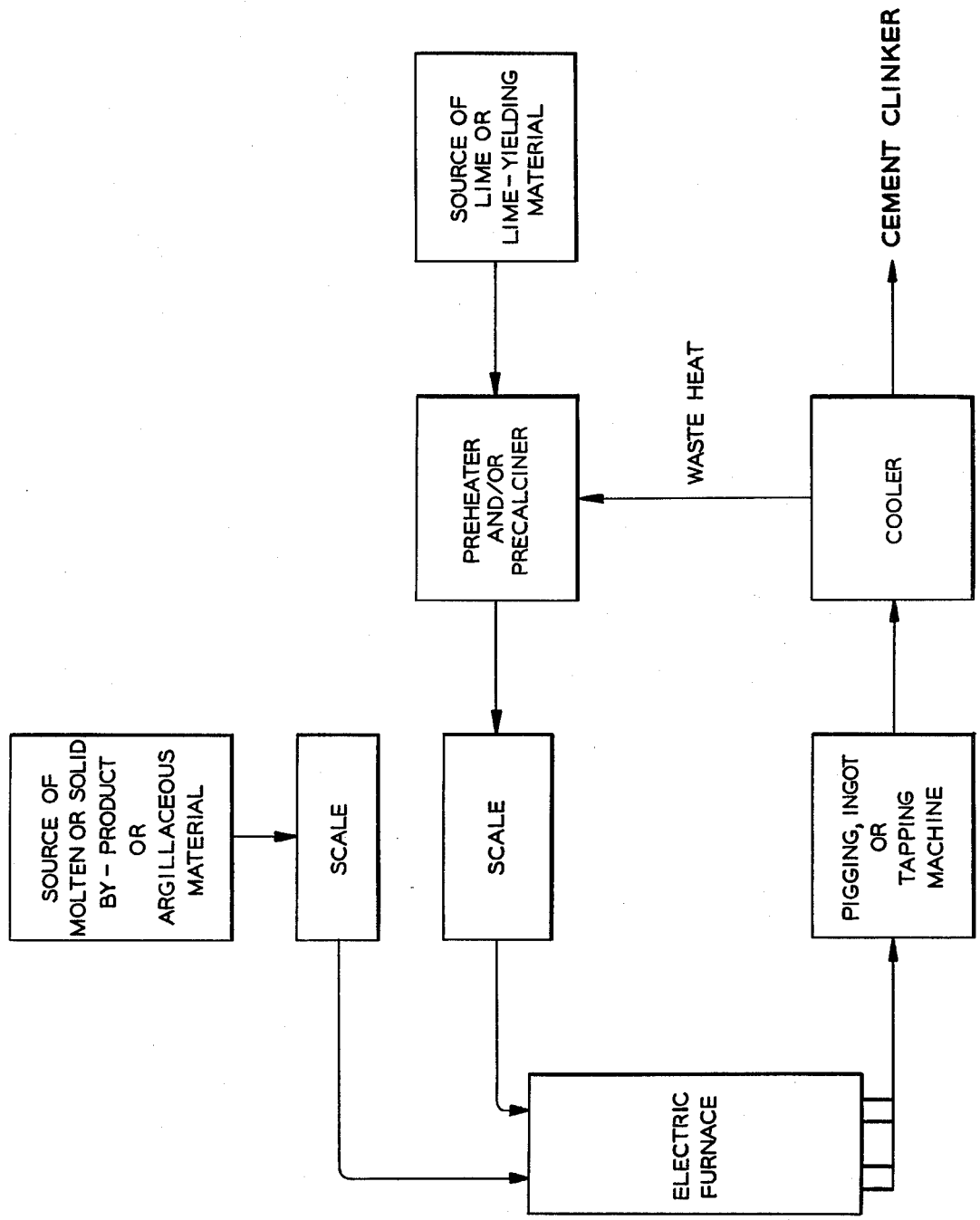

PROCESS FOR PRODUCING PORTLAND AND OTHER HYDRAULIC CEMENTS

RELATED APPLICATION

This application is a continuation-in-part of the co-pending application, Ser. No. 690,510, of Eddie K. Wilson, Sr., filed May 27, 1976, and entitled Process and Apparatus for Producing Portland Cement, now abandoned.

BACKGROUND OF THE INVENTION

1. Field of Invention

This invention relates to the manufacture of portland and other hydraulic cements suitable for use wherever a hydraulic cement is utilized. More particularly the present invention relates to a process for the making of portland and other hydraulic cements for such use.

2. Description of the Prior Art

The hydraulic cements represent an important group of cementing materials which are used principally in the construction industry. These cements have the special property of setting and hardening under water. The essential components of the cements are lime (CaO), silica ($SiO_2$) and components derived from them. In the presence of water, these components react to form, ultimately, a hardened product containing hydrated calcium silicate. The hydraulic cements include portland cement as well as high alumina cement, hydraulic lime, and other lesser known cements.

Of all the hydraulic cements, from a commercial standpoint portland cement is by far the most important, for this cement is a major construction material that is utilized in practically all concrete as well as in most of the masonry mortars. The principal components of portland cement are tricalcium silicate ($3CaO.SiO_2$), dicalcium silicate ($2CaO.SiO_2$), and tricalcium aluminate ($3CaO.Al_2O_3$), all of which, when in a ground or powdered condition, will react with water to form a hard, stonelike substance held together with intermeshed crystals. A fourth compound, tetracalcium aluminoferrite ($4CaO.Al_2O_3.Fe_2O_3$), does not exhibit any cementitious properties. The exact composition of portland cement is defined in A.S.T.M. Standard Specifications which are accepted by the industry.

Generally speaking, portland cement is currently obtained by finely intergrinding ground lime and silica and heating the mixture within a rotary kiln to the point of incipient fusion. Incipient fusion occurs at or about 1280° C., depending upon the fluxes that are present in the mixture. The principal fluxes are alumina ($Al_2O_3$) and iron oxide ($Fe_2O_3$), and these fluxes enable the chemical reactions to occur at relatively low temperatures. Normally the lime is obtained from natural calcareous deposits such as limestone, marl, and aragonite. The silica and fluxes, on the other hand, are normally derived from natural argillaceous deposits such as clay or shale.

Stated briefly, portland cement is made as follows: An argillaceous material and a calcareous material are crushed, mixed and interground to a fine powder. The composition of this mixture must be kept constant within narrow limits, as any wide departure from the optimum will result in an inferior cement. The mixing and intergrinding may be done in the dry condition (the dry process) or it may be done in water (wet process).

The mixture then passes into a rotary kiln where it is heated slowly, due to equipment limitations, to the sintering point. It is essential, however, that regardless of the method of preparation, the mixture before entering the rotary kiln be correctly proportioned, and finely interground. Water and carbon dioxide are driven off before the clinkering zone of the rotary kiln is reached. As the hotter regions are approached, chemical reactions take place between the constituents of the raw mixture. In the course of these reactions new compounds are formed, and some of these melt to partially fuse the charge. The clinker then is caused to drop down into some form of cooler, or is conveyed to a clinker pile where it is cooled, sometimes with a spray of water. When cool, the clinker is mixed with a carefully controlled quantity of gypsum, and the mixture is ground to a very fine powder. That finely ground powder is the portland cement of commerce.

Such a process is not capable of producing the desired product within current technology unless the raw feed materials are first intimately interground prior to introduction into the rotary kiln. Rotary kilns vary in length and diameter. They revolve slowly (one turn in every 1 to 2 minutes) and, as they are slightly inclined, the charge slowly travels downwardly toward the hot end of the kiln. Rotary kilns are heated from the lower end. The hottest temperatures therefore develop in a rather narrow zone at the lower end of the kiln, and become less in the upper end. The maximum temperatures at which rotary kilns are capable of operating are about 1400° C. to 1500° C. At no time does the entire mixture in the rotary kiln become molten. Special refractories are required, especially for the hot zone. Attempting to operate a rotary kiln above the above stated temperature range will result in too high a percentage of the feed mixture becoming liquid at one time and running uncontrollably out of the kiln or in severe damage to the refractories and to the kiln shell.

There is therefore a great need in the industry for a process which will quickly and efficiently cause the necessary chemical reactions and overcome the foregoing problem contrary to the currently used tedious process above-described. It is therefore an object of the present invention to provide an uncomplicated and relatively inexpensive process for rapidly producing portland cement suitable for use in commerce.

Indeed, current cement production is one of the most capital intensive, energy intensive, and environmentally repugnant industries from the standpoint of capital costs, energy costs, and pollution control costs being reflected in the selling price of the final product. The present invention is designed to alleviate these major problems within current cement manufacturing processes.

SUMMARY OF THE INVENTION

The present invention resides in a process in which raw feed particles of calcareous and argillaceous substances are introduced into an electric furnace that quickly yields compounds that possess the chemical constituency of portland cement or some other desired hydraulic cement. The raw feed materials need not be intimately interground as is required by all current cement manufacturing technology.

In addition, the invention provides for the use of feed materials, either in a solid or molten state, that are by-products of other industrial processes, particularly those which employ blast, electric arc, or induction electric furnaces that produce by-products which are rich in calcium silicates.

The foregoing by-product materials when cooled and solidified are known as slag. Normally this molten material, which contains high quantities of energy, is merely discharged onto the ground, forming slag heaps, and the energy contained within it is dissipated into the atmosphere. Others have recognized the possibility of adding deficient oxides to cooled slag to produce cements. In most of these attempts, the slags have been pulverized and mixed with slaked lime or portland cement to form so-called slag cements. These cements, however, do not possess the chemical constituency of portland cement and have always encountered low market acceptance.

Prior to this invention attempts have been made to produce hydraulic cements from molten calcium silicate by-products but these attempts have not produced any processes that yield portland cement. The major difficulty seems to reside in chemically combining the lime or lime-containing substances and the molten calcium silicates. As a result, the end product contains excessive quantities of uncombined lime and not enough of the effective cementing compounds. U.S. Pat. No. 397,373 to R. W. Lesley is representative of such prior attempts.

Laboratory experiments conducted over several years have proven that the present invention will produce high quality portland cements utilizing molten calcium silicate and lime or limestone that is neither ground nor intimately intermixed with anything else as raw feed materials, thereby resulting in a substantial savings in total energy consumption. In the typical portland cement manufacturing process, the calcareous and argillaceous raw materials are pulverized and intimately interground to an extremely fine consistency—normally small enough to pass a standard No. 200 sieve. This alone consumes considerable energy and is not required in this invention. Obviously, the conventional rotary kiln process for producing portland cement consumes enormous amounts of energy. In addition to the preparatory intergrinding and mixing, all raw materials must be elevated to the high reaction temperature. Furthermore, all calcareous materials must be calcined, whereas this invention can utilize molten by-products containing materials that have been previously calcined in a separate manufacturing process that normally discards the by-products containing an enormous amount of energy and creating in many instances adverse environmental problems.

One of the principal objects of the present invention is to provide a process by which molten by-products from unrelated manufacturing processes composed chiefly of calcium silicates and containing a great amount of heat energy is utilized in the production of portland and other hydraulic cements. Another object is to provide a process of the type stated in which similar chemical but solid by-products along with other calcareous, argillaceous, and fluxing materials can be fed into an electric furnace and quickly produce a compound containing the chemical constituency of portland cement at a substantially smaller capital cost for plant, lower energy consumption than current conventional cement manufacturing processes, utilize by-products that contain large amounts of heat energy that is currently being wasted and a process that is practically pollution free.

By being able to maintain a molten bath within an electric furnace, it is possible to feed materials which have not been pulverized nor intimately interground. Also the molten bath concept promotes rapid and complete chemical reaction between the feed materials. This invention meets all these objectives.

DESCRIPTION OF THE DRAWINGS

The accompanying drawing is a schematic diagram of the process for producing portland and other hydraulic cements.

DETAILED DESCRIPTION

Broadly speaking, the process of the present invention involves introducing raw materials that contain compounds necessary for the production of portland or other hydraulic cements into a melt in proper proportions. Within the melt the compounds react with each other and with the melt, all such that the melt acquires the chemical constituency of portland cement or whatever hydraulic cement that is desired. The melt is contained within a furnace which supplies enough heat to the melt to maintain it in a molten condition at at least the temperature at which the chemical reactions occur. The furnace is tapped either intermittently or continuously to withdraw the portion of the melt that has acquired the chemistry of the desired cement, and this withdrawn portion is permitted to solidify.

Since portland cement is by far the most significant of all the hydraulic cements, the process will be described as it applies to the production of portland cement, but it should be recognized that by varying raw materials and proportions, other hydraulic cements may be produced.

The raw materials may be molten or solid, but any solid raw material should for the most part be in a nonpulverent condition. Nonpulverent in this context means not finely divided, that is, having its particles sized considerably larger than those of a powder or pulverized substance as is normally used in cement manufacturing processes that employ rotary kilns. In this regard, nonpulverulent raw materials present a more limited surface area to the liquid of the melt, and while such raw materials tend to chill the melt, the chilling effect is not so great as to solidify the melt or regions of it as occurs with finely pulverized feed materials. On the contrary, the nonpulverulent particles dissolve slower in the melt and the components of it combine with other feed components in the melt such that the melt quickly acquires the chemistry of portland cement. Pulverulent material, on the other hand, presents a substantially larger surface area to the melt, effectively chilling the melt beyond the capabilities of economically sized furnaces to maintain the melt completely molten without supplying inordinately large amounts of energy.

Preferably, the furnace is heated from within the melt so that the highest temperatures are at the center of the melt. Indeed, it is desirable to allow the melt to solidify adjacent to the walls of the furnace so that the solidified portion will serve as a refractory and insulating lining for the furnace. Of course, the furnace should be constructed with its own refractory lining to enable it to withstand the molten material when it is first introduced into the furnace, but since the molten material is allowed to solidify adjacent to the basic refractory lining, that lining need not be nearly as elaborate or as costly as conventional refractory linings such as those used in conventional cement rotary kilns. Thus, the melt is self-lining on the basic refractory and serves to prolong the life of the basic refractory and reduce energy costs.

Electric furnaces are ideally suited for containing the melt since the heat is generated within the melt. Furthermore, such furnaces generate large convection currents within the melt and these serve to quickly promote complete chemical reactions.

An ideal source for the initial charge of molten material for the furnace is any of the industrial processes that produce by-products that are rich in calcium silicate ($CaO.SiO_2$) and are in a molten state. This molten by-product when solidified is known as slag. Once the initial charge is in the furnace, other raw materials are added to it while at the same time the furnace is tapped. Of course, the initial taps of the furnace do not yield a substance having the chemical constituency of portland cement, but soon the melt does reach a balanced condition where it has the chemistry of portland cement.

In its most practical format, the process utilizes two major raw materials, namely a molten material that is rich in calcium silicate ($CaO.SiO_2$) and lime ($CaO$) or a lime-yielding substance, such as calcium carbonate ($CaCO_3$). The melt is initially the molten material and is maintained at a temperature hot enough to enable it to combine with the lime ($CaO$) such that sufficient quantities of tricalcium silicate ($3CaO.SiO_2$) and dicalcium silicate ($2CaO.SiO_2$) are formed to qualify the melt as having the chemistry of portland cement. Thereafter the molten material and the lime or lime-yielding substance are added to the melt in proportions which insure that the melt, in the region where it is drawn off, maintains the chemistry of portland cement. The molten material, being a liquid, is merely poured into the melt in measured quantities. The lime or lime yielding substance, on the other hand, should be in a nonpulverant condition and is dumped into the melt in measured quantities.

The electric furnace maintains a major portion of the melt at a temperature no lower than the incipient fusion temperature for calcium silicate and lime, and that temperature to a large measure depends on the type and amount of fluxes in the melt. These fluxes are normally present in the molten material and the major ones include alumina ($Al_2O_3$) and iron oxide ($Fe_2O_3$). In most instances the incipient fusion temperature is above 1280° C. but less than 1900° C., depending on the fluxes present. Preferably the furnace maintains the melt at a temperature at which tapping can be easily accomplished. In any event, the temperature is such that adquate proportions of tricalcium silicate ($3CaO.SiO_2$) and dicalcium silicate ($2CaO.SiO_2$) are formed to meet the requirements for portland cement. Most likely tricalcium aluminate ($3CaO.Al_2O_3$) is also present.

The most practical sources of the molten calcium silicate are the various processes which produce by-products known as slag. These processes include steel production, phosphorous production, and chromium smelting, to name a few. Normally, the molten by-product is collected in a large ladle. That ladle may be used to transport the molten product to the electric furnace, or it may be transported in some other manner. In any event, the by-product enters the melt in the furnace in a molten condition. Consequently, it possesses a considerable amount of energy. This reduces the energy demands of the process. Whatever its source, the molten by product should be rich in calcium silicate ($CaO.SiO_2$) and will normally contain fluxes such as alumina ($Al_2O_3$) and iron oxide ($Fe_2O_3$).

The molten calcium silicate may also be derived by heating lime ($CaO$) and silica ($SiO_2$) to a temperature sufficiently high to enable the two compounds to combine and form calcium silicate. This, of course, requires a substantial amount of energy, and is not justified when a source of molten calcium silicate is available.

Perhaps the most practical source of the lime or lime-yielding substance is limestone which is high in calcium carbonate ($CaCO_3$). When heated to about 900° C., the calcium carbonate decomposes into lime ($CaO$) and carbon dioxide ($CO_2$), the latter of which, being a gas, escapes. Thus, limestone may serve as the source of the lime, and it may be either fully or partially calcined by preheating with waste heat from this process. Irrespective of whether lime or limestone is introduced into the melt, only lime remains to combine with the calcium silicate, because the temperature of the melt exceeds the temperature at which calcium carbonate decomposes.

The lime or lime-yielding substance, being a solid, should for the most part be in a nonpulverulent condition. This means it should not be pulverized or otherwise in a finely divided state. In this regard, the limestone used in the conventional rotary kiln process for producing portland cement is normally derived from a quarry, but between the quarry and the kiln, it undergoes several reductions in size. In particular, first the wall of the quarry is blasted, yielding large rocks. Those rocks are reduced to smaller rocks in a primary crusher. The rocks from the primary crusher are reduced still further in size in a secondary crusher. Thereafter, the rocks from the secondary crusher are pulverized where they are reduced to fines. Finally, the fines are introduced into a ball mill where they are mixed with argillacious materials such that the mixture is intimately interground into a very fine state. In the process of the present invention, the limestone rocks from the primary crusher may be utilized either directly or after being preheated or calcined, and certainly there is no need to carry the reduction all the way through a ball mill. This alone saves considerable capital investment, as well as operating and energy costs.

The actual physical dimensions of the particles of lime or lime-yielding substance are not too critical as long as the particles are not fed to the furnace in a pulverulent condition. Preferably the lime or lime-yielding substance should have a particle size of $\frac{3}{4}$ inches by $2\frac{1}{2}$ inches, meaning it should pass a $2\frac{1}{2}$ inch screen and be retained on a $\frac{3}{4}$ inch screen. The selection of the size of the lime or lime-yielding particles is limited by the preheating, precalcining or furnace equipment that is used. Pulverulent or undersized lime presents a large surface area, and if introduced into the molten calcium silicate in large enough quantities, it will function as a heat sink that effectively freezes the calcium silicate in its immediate vicinity, thereby affecting furnace operating efficiency. Experiments and investigations conducted on the process of this invention have shown the best particle size utilizing currently available electric furnaces, preheaters, and/or precalciners, to be $\frac{3}{4}$ inches by $2\frac{1}{2}$ inches, whether fed as lime or lime-yielding materials. The exact particle size range will therefore depend upon the equipment available to practice this process.

The proportions at which the lime or the lime-yielding substance, and the calcium silicate are mixed depends on the chemical constituency of the raw materials themselves, for the ratios at which the various oxides of silicon, calcium, and aluminum must exist in order to obtain portland cement are well known and have been the subject of considerable published research.

The sized particles can be heated within a preheater to a temperature sufficiently high to at least partially calcine the limestone, that is, liberate some of the carbon dioxide. Raising the temperature of the limestone to about 900° C. serves this purpose. The partially calcined limestone passes onto a scale where its weight is recorded, and from the scale it is introduced into the feed end of the electric furnace.

The molten by-product, on the other hand, collects within ladles which are delivered to a scale from which the weight of the molten by-product in each ladle is determined. The ladles are emptied into the feed end of the furnace.

Thus, both the molten by-product and the lime-yielding substances are added intermittently to the melt in the furnace in proportions that will yield portland cement. These proportions are controlled with a high degree of precision by the scales. The molten by-product, being fluent, mixes easily with the melt which is likewise fluent. The lime-yielding substance, on the other hand, tends to float on the surface of the melt where the intense heat causes the lime particles to spall and mix with the molten calcium silicate. In other words, each particle of lime-yielding substance tends to chemically combine at its surface and enter the melt somewhat gradually. This in turn prevents rapid quenching of the melt at the feed end, and as a consequence the lime tends to combine with the calcium instead of coalescing into layers or strata of uncombined lime. In this regard, lime (CaO) melts at a temperature considerably higher than that of the melt and consequently can exist as strata within the melt. All of the particles tend to spall irrespective of whether they have been fully or partially calcined. Not only does the high temperature of the melt cause the lime particles to spall, but it further accelerates the liberation of carbon dioxide, should any remain, so that after a short time the lime-yielding substance is decomposed fully. The escaping carbon dioxide somewhat accelerates the disintegration of the lime-yielding particles and creates an effervescence in the melt. To a limited extent the effervescing particles tends to promote mixing. The effervescence is particularly pronounced when the preheater or precalciner is eliminated from the process, in which case the limestone is introduced directly into the melt.

In any event, the fact that the calcined lime is in a relatively large particle size, instead of a pulverulent condition, enables it to disintegrate slowly at a controlled pace. The lime combines easily with the calcium silicates of the melt to produce, primarily, tricalcium silicate and dicalcium silicate. The disintegration is slow enough to provide a controlled introduction of the lime into the molten calcium silicate—one that will not cause any stratification of the lime within the calcium silicate. Thermal currents within the electric furnace agitate the melt and further promote the chemical reactions between the calcium silicate and the lime within the melt.

The furnace is tapped at the end opposite from where the molten by-product and lime-yielding materials are introduced, and between the two ends the calcium silicate and the lime have an opportunity to thoroughly mix together and chemically combine in the formation of tricalcium silicate and dicalcium silicate.

The electric furnace may be tapped intermittently or continuously, but in either case the melt is run out into a machine where it solidifies into pigs or ingots. The pigs or ingots then pass to an air quench cooler where their temperature is reduced from about 1600° C. to the region of 100° C. to 150° C. Reduction in size of pigs or ingots will depend on cooling rate requirements. The cooling from about 680° C. must be rapid enough to prevent the dicalcium silicate in the beta phase from converting to the gamma phase. The latter crumbles or "dusts" and is not cementitious.

The heat that is extracted from the pigs, ingots, or crushed clinker, at the air quench cooler is transferred to the preheater where it serves to preheat and/or partially calcine the lime-yielding substance that passes through the preheater. This is best achieved by directing heated air discharged from the cooler into the preheater.

The pigs or clinkers upon leaving the cooler are either shipped to a purchaser or stored. Ultimately the pigs or clinkers are crushed and ground to a fine powder which is suitable for use as portland cement.

While it is most desirable to use a molten by-product because of the enormous amount of energy it contains, slag may be used in lieu of the molten by-product. In this regard, it will be recalled that the molten by-product which is high in calcium silicate, once it has solidified is referred to as slag. Many slag heaps exist throughout the country, providing an abundant supply of calcium silicate. This slag is crushed to a nonpulverulent condition and introduced into the furnace melt, much the same as the lime or lime-yielding substances. It need not be interground with the lime or lime-yielding substance. Of course, care is exercised to insure that the lime and lime-yielding substances are in the proper proportions to ultimately provide a high quality portland cement.

Other raw materials are also suitable for use in this process. For example, conventional argillaceous and calcareous materials used in rotary kilns are suitable, as long as those materials are supplied to the furnace melt at the proper feed rate and in the proper proportions.

Whereas the conventional processes for producing portland cement consume 4,000,000 to 7,000,000 BTU per ton of clinker produced, the present process in its most practical format consumes only about 1,500,000 BTU per ton, a substantial savings in energy. This saving derives primarily from the fact that one of the raw materials, namely, the calcium silicate, enters the process in a molten state and hence contains substantial energy. Further energy savings are attributable to the consistency of the raw materials which need not be pulverized or finely ground. Aside from the energy savings, the capital expenditure necessary for constructing a plant capable of producing portland cement according to the present process is about one-third that of constructing a conventional rotary kiln-type plant.

Moreover, the composition of the cement that is derived may be changed relatively easily to provide a wide range of the constituents of hydraulic and portland cements. Indeed, within reasonable limits it is possible to produce prescription cements that may or may not qualify as portland cement.

Finally, the process produces little, if any, air emissions, and therefore does not require expensive pollution control equipment. In contrast, rotary kilns which utilize the conventional process require substantial pollution control and energy intensive equipment.

This invention is intended to cover all changes and modifications of the example of the invention herein chosen for purposes of the disclosure which do not constitute departures from the spirit and scope of the invention.

What is claimed is:

1. A process for producing portland cement or other hydraulic cements, said process comprising: maintaining in an electric furnace a melt which has the chemical constituency of the desired hydraulic cement; introducing a molten material into the melt; introducing a solid material into the melt with the solid material being in a nonpulverulent condition; mixing the solid and molten materials within the melt by currents generated within the melt by the furnace; allowing the molten material to chemically combine with the solid material within the melt such as to maintain the chemical constituency of the melt at that for the desired hydraulic cement; withdrawing the melt from the furnace; and cooling the withdrawn melt to a solid that has the properties and chemistry of the desired cement.

2. A process according to claim 1 and further comprising preheating the solid feed material with heat that is derived from cooling the withdrawn melt.

3. A process for producing hydraulic cements including portland cement, said process comprising: maintaining a melt within an electric furnace, with the melt having the chemical constituency of the desired hydraulic cement; heating the melt within the electric furnace and contemporaneously mixing the melt with thermal currents generated within the melt by the electric furnace; feeding appropriate materials by gravity into the melt at the surface of the melt and in proportions suitable for providing the melt with the chemical constituency of the desired hydraulic cement; allowing the feed materials to chemically combine within the melt; withdrawing the melt from the electric furnace; and cooling the withdrawn melt to solidify it into a solid substance that has the chemical constituency and properties of the desired hydraulic cement.

4. A process according to claim 3 wherein at least one of the feed materials is a solid and contains calcium carbonate and said one solid feed material is heated prior to introduction into the electric furnace with the heating being sufficient to either partially or completely decompose the calcium carbonate.

5. A process according to claim 4 and further comprising cooling the solidified melt to extract heat therefrom and using the extracted heat for pre-heating the solid feed materials.

6. A process according to claim 3 wherein at least one of the feed materials is a solid and is composed of larger particle sizes than is permissible under any current cement manufacturing technology.

7. A process according to claim 3 wherein one of the feed materials fed into the electric furnace is a molten by-product material and another is a solid material that is composed of larger particle sizes than is permissible under any current cement manufacturing technology.

8. A process according to claim 3 wherein all or part of the feed materials can be composed of larger particle sizes than is permissible under any current cement manufacturing technology.

9. A process for producing portland cement or other hydraulic cements, said process comprising: introducing raw materials containing compounds suitable for the production of the desired cement into a melt that is contained within an electric furnace and is hot enough to cause the compounds to chemically combine with each other and the melt such that the melt acquires the chemical constituency of the desired cement, at least one of the materials being a solid in a nonpulverulent condition.

10. The process according to claim 9 and further comprising heating the melt to maintain it at a temperature sufficient to chemically combine the compounds of the raw materials.

11. The process according to claim 10 wherein the melt is heated from within the melt by an electric heating apparatus.

12. The process according to claim 9 said one raw material is lime or a lime-yielding substance.

13. The process according to claim 12 wherein another of the raw materials is a molten material that is rich in calcium silicate.

14. The process according to claim 12 wherein another of the raw materials is a solid that is rich in calcium silicate and is in a nonpulverant condition.

15. The process according to claim 9 wherein said one material is derived by heating calcium carbonate that is in a nonpulverulent condition to a temperature sufficient to at least partially decompose the calcium carbonate.

* * * * *